US007754313B2

(12) United States Patent
Hori et al.

(10) Patent No.: US 7,754,313 B2
(45) Date of Patent: Jul. 13, 2010

(54) IMAGE TRANSFER SHEET

(75) Inventors: Hiroyuki Hori, Kanagawa-Ken (JP); Yoshio Iwasaki, Kanagawa-Ken (JP)

(73) Assignee: Kabushiki Kaisha Meiji Gomu Kasei, Tokyo (JP)

( * ) Notice: Subject to any disclaimer, the term of this patent is extended or adjusted under 35 U.S.C. 154(b) by 958 days.

(21) Appl. No.: 10/551,547

(22) PCT Filed: Feb. 26, 2004

(86) PCT No.: PCT/JP2004/002297

§ 371 (c)(1), (2), (4) Date: Sep. 28, 2006

(87) PCT Pub. No.: WO2004/088434

PCT Pub. Date: Oct. 14, 2004

(65) Prior Publication Data

US 2007/0009684 A1 Jan. 11, 2007

(30) Foreign Application Priority Data

Mar. 31, 2003 (JP) ............................ 2003-094586

(51) Int. Cl.
*B32B 7/14* (2006.01)

(52) U.S. Cl. .................... 428/201; 428/195.1; 428/202; 428/209; 428/213; 428/217; 428/220; 428/914; 101/375; 101/395; 101/401.1

(58) Field of Classification Search ............. 428/195.1, 428/201, 202, 209, 213, 217, 220, 914; 101/375, 101/395, 401.1
See application file for complete search history.

(56) References Cited

U.S. PATENT DOCUMENTS

| | | | | |
|---|---|---|---|---|
| 3,483,027 | A * | 12/1969 | Mache et al. | 216/52 |
| 5,047,808 | A * | 9/1991 | Landa et al. | 399/308 |
| 5,431,989 | A * | 7/1995 | Beltzung et al. | 428/218 |
| 6,182,568 | B1 * | 2/2001 | Ogita et al. | 101/376 |
| 6,969,543 | B1 * | 11/2005 | Aronhime et al. | 428/32.5 |
| 2003/0116044 | A1 * | 6/2003 | Buono et al. | 101/395 |

FOREIGN PATENT DOCUMENTS

JP 4335381 11/1992

(Continued)

*Primary Examiner*—Betelhem Shewareged
(74) *Attorney, Agent, or Firm*—Honigman Miller Schwartz and Cohn LLP

(57) ABSTRACT

An image transfer sheet includes a withstand voltage layer provided on a surface of a release layer where an image is formed and transferred, and a conductive compressive layer laid on the withstand voltage layer by way of a conductive support layer. The release layer is formed of a fluororesin or an elastomer, and its surface tension is 20 mN/m or less. The release layer has a thickness of 0.01 mm or more. The withstand voltage layer preferably has a thickness of 0.2 mm or more, a volume electrical resistivity within a range of $10^5$ Ω-cm through $10^9$ Ω-cm at room temperature, and a matrix hardness of 80 JIS-A or less. Further, the conductive compressive layer preferably has a volume electrical resistivity of $10^4$ Ω-cm or less at room temperature, and a porosity of 30 to 70%. In addition, the support layer has a volume electrical resistivity similar to that of the conductive compressive layer, and can comprise woven cloth regulated by conductive fibers.

4 Claims, 2 Drawing Sheets

FOREIGN PATENT DOCUMENTS

| | | |
|---|---|---|
| JP | 667551 | 3/1994 |
| JP | 10232572 | 9/1998 |
| JP | 10247023 | 9/1998 |
| JP | 11231683 | 8/1999 |
| JP | 200029328 | 1/2000 |
| JP | 200056575 | 2/2000 |

* cited by examiner

IMAGE TRANSFER SHEET

TECHNICAL FIELD

This invention relates to an image transfer sheet for use in digital printing. More particularly, the invention relates to an image transfer sheet which can provide printing quality equal to that of normal offset printing even in digital printing and can be simply and easily installed.

BACKGROUND

Digital printers capable of outputting variable data which are in use and include those based on a inkjet method, and methods using magnetism, ions, electric condensation, etc, in addition to an electrophotographic method, but the electrophotographic method is currently the most widely spread. This electrophotographic method is a technique used in copying machines and laser printers, and also called a xerography method. This is a variable printing method which allows rewriting every time, and has been creating new demand for printing.

In a digital printer using this electrophotographic method, a positive charge is given by a corona discharge to a photo conductor drum charged by laser, and if an image is described into this photo conductor drum by the laser or a light emitting diode (LED), the charge is neutralized in the portion of the drum where the image has been described. If toner is provided to this part, the toner only adheres to the part where the charge remains, thereby forming an image. Then, the printing machine is used to transfer the image by superposing paper on the toner image.

This electrophotographic method described above further includes a direct transfer method which performs the transfer from the photo conductor drum directly to the paper, and an offset transfer method in which the image is once transferred to an intermediate transfer sheet and then transferred from the intermediate transfer sheet to the paper. The former provides printing quality lower than that of normal offset printing, and is not capable of printing on an embossed sheet and the like. The latter is very expensive because the intermediate transfer sheet has a particular configuration and performance. The latter also has a particular installation structure in which an electrode, among others, has to be removed when the intermediate transfer sheet is attached to a transfer drum, which causes much difficulty in handling.

The intermediate transfer sheet for use in the latter method includes, for example, an intermediate transfer blanket described in Japanese Patent Publication Laid-open No. 11-512910. This blanket comprises an image transfer portion adapted to receive an image which has already been formed, and a body portion attached to the transfer drum. The image transfer portion comprises an alignment layer provided under a release layer to be a transfer surface, while the body portion comprises a conductive top layer, a compressive layer and woven cloth layer. The blanket is formed by stacking the alignment layer of the image transfer portion on the top layer with or without the conductive layer in between.

To use the intermediate transfer blanket having such a configuration, an elongate conductive bar in which a series of L-shaped attachment legs is integrally formed is attached to an end of the intermediate transfer blanket for installation on the drum. To attach the conductive bar, the conductive layer is directly inserted without including the release layer, the alignment layer and an obstacle layer, thereby integrally forming the conductive bar.

Thus, in the known blanket, the conductive bar serves as the electrode to supply a voltage to the conductive layer. Therefore, the electrode also has to be removed when the blanket is attached to the transfer drum, which causes a problem in that the structure is complicated and that the attachment is troublesome. Another problem is that when the blanket is replaced, it is necessary to cut the blanket along an edge of an attachment member which is the conductive bar and to separate the attachment member from the blanket in order to remove the attachment member from the drum. Its manufacturing method is also complicated and significantly expensive.

It is therefore an object of this invention to provide an image transfer sheet which solve the foregoing problems, wherein printing quality equal to that of the normal offset printing is maintained in printing with an image forming technique (apparatus) using a principle of the electrophotographic method, and wherein the electrode can be directly removed from the drum and can be installed on the drum in a significantly simple manner.

Furthermore, this invention provides an image transfer sheet which can be manufactured in an inexpensive, simple and easy manner.

It is another object of this invention to provide an intermediate image transfer sheet particularly suited to transfer a liquid toner image.

SUMMARY OF THE INVENTION

This invention provides the following configuration to achieve the above-mentioned objects. That is, an image transfer sheet according to this invention is characterized in that it comprises a withstand voltage layer provided on the lower surface of a release layer where an image is formed and transferred, and a conductive compressive layer laid on the withstand voltage layer by way of a conductive support layer. The release layer is preferably formed of a fluororesin or an elastomer, and its surface tension is 20 mN/m or less, The release layer has a surface tension of 20 mN/m or less and a thickness of 0.01 mm or more. The withstand voltage layer preferably has a thickness of 0.2 mm or more.

Furthermore, the withstand voltage layer has a thickness of 0.2 mm or more, and a volume electrical resistivity in the range of $10^5$ Ω-cm through $10^9$ Ω-cm at room temperature. It preferably has a matrix hardness of 80 JIS-A or less. Further, the conductive compressive layer preferably has a volume electrical resistivity of $10^4$ Ω-cm or less at room temperature, and a porosity of 30 to 70%.

In addition, the support layer has a volume electrical resistivity of $10^4$ Ω-cm or less at room temperature, and may comprise woven cloth regulated by conductive fibers. Further, the support layer preferably has a breaking strength of 1000 N/50 mm or more, and a volume electrical resistivity of $10^4$ Ω-cm or less at room temperature similar to that of the conductive compressive layer. The support layer preferably has a breaking elongation of 10% or less. Moreover, the image transfer sheet preferably has a modulus in stress of 1.0 MPa or less when the image transfer sheet is distorted 0.1 mm, and a modulus in stress of 2.0 MPa or more when the image transfer sheet is distorted 0.3 mm. The image transfer sheet preferably has a breaking strength of 2000 N/50 mm or more and a breaking elongation of 10% or less.

DETAILED DESCRIPTION OF THE INVENTION

Figure 1:
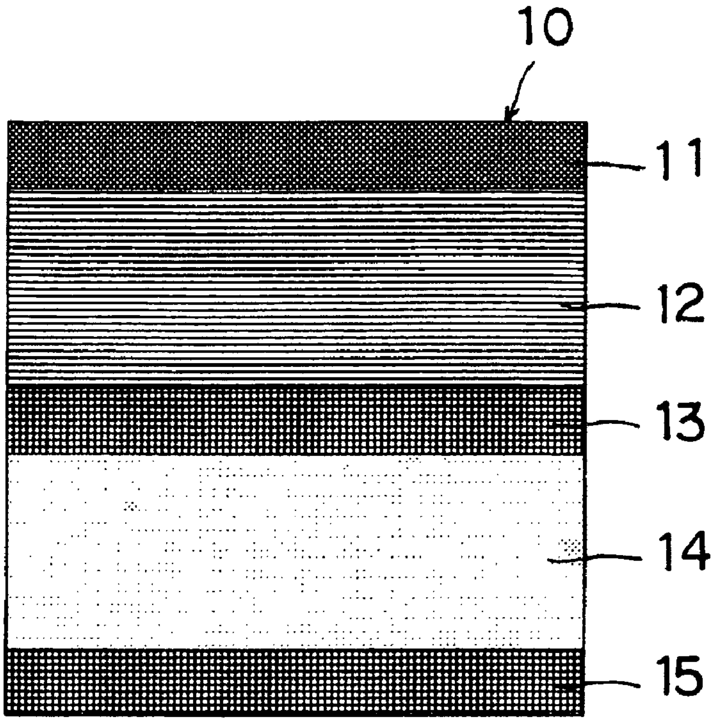
FIG. 1 is a sectional view of an image transfer sheet according to an embodiment of this invention.

This invention will be described in greater detail with reference to the accompanying drawings.

An image transfer sheet 10 according to this invention comprises a withstand voltage layer 12 provided on the lower surface of a release layer 11 where an image is formed and transferred, and a conductive compressive layer 14 provided on the lower surface of the withstand voltage layer 12 by way of a conductive support layer 13. The conductive compressive layer 14 is supported by a support layer 15. Further, the image transfer sheet 10 is configured by sequentially and integrally stacking the release layer 11, the withstand voltage layer 12, the conductive support layer 13, the conductive compressive layer 14 and the conductive support layer 15.

The image transfer sheet 10 according to this invention is characterized in that the conductive support layers 13, 14 and 15 having the compressive layer 14 are stacked on the release layer 11 by way of the withstand voltage layer 12. That is, to use the image transfer sheet 10 by winding it around a drum, a surface contacting the drum is formed in the conductive layers. The release layer 11 is preferably formed of a fluororesin or an elastomer. The fluororesin includes polytetrafluoroethylene, polychlorotrifluoroethylene, polyvinyl fluoride, polyvinylidene fluoride, etc. The release layer 11 may be applied and stacked at a predetermined thickness by a spreader, a knife coater, roll coater or the like.

Furthermore, the image transfer sheet 10 according to this invention is characterized in that the withstand voltage layer 12 is provided between the release layer 11, and the support layer 13, the compressive layer 14 and the support layer 15 which are the conductive layers. The withstand voltage layer 12 is formed so that it shuts off (i.e. insulates) a voltage from the conductive layers to a certain degree and is not charged.

To further describe configurations of the respective layers, the release layer 11 has a thickness of 0.01 mm or more so that the image is transferred to the release layer 11 and the image can be easily transferred to paper from the release layer 11. This is because a uniform thickness cannot be ensured and sufficient release effects cannot be provided if the thickness of the release layer 11 is small. Moreover, the release layer 11 preferably has a surface tension of 20 mN/m or less. This is because 100% transfer is not achieved to possibly cause unevenness if the surface tension is over 20 mN/m.

Next, the withstand voltage layer 12 is a layer which shuts off the voltages of the conductive support layer 13 and the layers thereunder flowing to the release layer 11, and is preferably formed of polymeric elastomer. Considering solvent resistance properties and adhesion properties exerted on the release layer 11, the withstand voltage layer 12 can be formed of, for example, NBR. The withstand voltage layer 12 has a thickness of 0.2 mm or more, preferably 0.3 mm or more. If the thickness of the withstand voltage layer 12 is smaller than 0.2 mm, it might result in an electric discharge and the withstand voltage layer 12 cannot function as the withstand voltage layer.

The withstand voltage layer 12 has a volume electrical resistivity in the range of $10^5$Ω-cm through $10^9$Ω-cm at room temperature, and a matrix hardness of 80 JIS-A (relevant portions of the JIS standard are attached hereto in Appendix A and are hereby incorporated by reference) or less. If the volume electrical resistivity is lower than the range of $10^5$Ω-cm through $10^9$Ω-cm at room temperature, the voltage from the conductive support layer 13 might flow to the release layer 11. Further, in a commonly used blanket for offset printing, it is known that an ink transfer ratio drops if the matrix hardness is higher than 80 JIS-A. Thus, it is preferable that the matrix hardness is also 80 JIS-A or less in the withstand voltage layer 12.

Moreover, it is preferable that the conductive compressive layer 14 easily passes the voltage contrary to the withstand voltage layer 12, and the conductive compressive layer 14 has a volume electrical resistivity of $10^4$ Ω-cm or less at room temperature. The conductive compressive layer 14 preferably has a porosity of 30 to 70%. The reason is that it does not sufficiently function as the compressive layer if the porosity is less than 30%, and that it might be destroyed by shear stress during image transfer if the porosity is more than 70%. For a material of the conductive compressive layer 14, solvent resistance properties, micro sphere mixing properties and the like are requested in addition to electric performance, and the conductive compressive layer 14 can be formed of polymeric elastomer such as NBR. Air gaps of the conductive compressive layer 14 may be independent air bubbles, and may also be air bubbles in communication with each other.

Various known methods have heretofore been known to shape the conductive compressive layer 14. For example, there is a foaming/shaping method wherein a foaming agent is blended into a synthetic rubber compound which forms the compressive layer, and the synthetic rubber compound is foamed while rubber is vulcanized, thereby producing the compressive layer having cells. There is also a hollow tiny globule mixing method wherein hollow tiny globules are blended instead of the foaming agent to form independent cells. Alternatively, for example, a powder elution method has been known wherein powder which can be eluted into eluate such as water or methanol, for example, sodium chloride or sugar is blended into the synthetic rubber compound, and the power is eluted after vulcanization, thereby producing the compressive layer having cells. One of these forming methods can be suitably adopted and implemented.

Next, the configurations of the conductive support layers 13, 15 will be described. The conductive support layers 13, 15 preferably have the volume electrical resistivity similar to that of the conductive compressive layer 14, which is $10^4$ Ω-cm or less at room temperature. The conductive support layers 13, 15 can be formed of, for example, woven cloth including cotton and rayon, in which case the woven cloth can be regulated by conductive fibers such as carbon fibers or metal fibers to ensure conducting properties. For the metal fiber, Thunderon (brand name, manufactured by Nihon Sanmou Dyeing Corporation) can be used, for example. Such conductive fibers can be used as weft by alternately weaving them with cotton thread. One example of the configuration of the woven cloth is shown as follows.

TABLE 1

| Configuration | | |
|---|---|---|
| Warp | Weft (alternately woven) | |
| 60/4<br>EC cotton | 30/1<br>AC cotton | 30/1<br>Thunderon |

EC: Egyptian comber
AC: American comber

Furthermore, the conductive support layers 13, 15 preferably have a simple-substance breaking strength of 1000 N/50 mm or more, and a breaking elongation of 10% or less. The breaking strength and the breaking elongation conform to those of a generally used compressive printing blanket manufactured by a company of the present applicant since the breaking strength thereof is set at 2000 N/50 mm or more and the breaking elongation thereof is set at 10% or less.

In an image transfer method using an image forming technique which takes advantage of a principle of an electrophotographic method, toner is electrically transferred onto the transfer sheet at low pressure, and the toner is then transferred 100% onto the paper at high pressure. Thus, the image transfer sheet preferably has a modulus in stress of 1.0 MPa or less when the image transfer sheet is distorted 0.1 mm, and a modulus in stress of 2.0 MPa or more when the image transfer sheet is distorted 0.3 mm.

Furthermore, the image transfer sheet preferably has a breaking strength of 2000 N/50 mm or more and a breaking elongation of 10% or less. The breaking strength and the breaking elongation conform to those of the generally used compressive printing blanket manufactured by the company of the present applicant since the breaking strength thereof is set at 2000 N/50 mm or more and the breaking elongation thereof is set at 10% or less.

The image transfer sheet according to this invention has the conductive supports and therefore allows an electrode to be directly removed from the drum. It is thus not necessary to attach a conductive bar to an end of the sheet or to provide the electrode in the drum. There is an offset printing method wherein the commonly used blanket for offset printing can be attached in the same manner as it is attached to a blanket cylinder, and a mounting bar made of aluminum or iron is additionally fastened to both ends of the sheet, and this mounting bar is then locked into a slit in the drum, thereby attaching the blanket. In addition, the blanket can be simply and easily installed, for example, by a sticky back method wherein a double-sided tape provided on the lower surface of the sheet is affixed to the drum, or a mini-gap method wherein an SUS plate is bonded to the lower surface of the sheet by hot melt and the SUS plate is wound around the drum and thus fixed.

EXAMPLE

Next, an example of an image transfer sheet according to this invention will be described together with comparative examples.

Surface Tension of Release Layer

The image transfer sheets having a configuration shown in FIG. 1 were used in the example of the present invention and the comparative examples. In the comparative examples, a release layer 21 was formed by NBR used in a surface rubber layer of a blanket for offset printing, and in the example of the present invention, the surface of the release layer 21 was coated with a fluororesin. Surface tension was changed among the comparative examples and the example of the present invention. A relation with the surface tension is shown in Table 1.

TABLE 2

| | Comparative Example 1 | Comparative Example 2 | Example 1 |
|---|---|---|---|
| Surface tension (mN/m) | 45 | 30 | 20 |
| Comments | BL for printing | BL for printing | BL for printing and article whose surface is coated with fluororesin |

Toner transfer in the example of the present invention and the comparative examples according to the above configurations is evaluated by installing the sheet in an actual device. Regarding evaluation standards, O is given when 100% transfer is achieved, otherwise X is given. Evaluation results are shown in Table 3. It is understood from these results that a surface tension of a release layer 11 is preferably 20 mN/m or less.

TABLE 3

| | Comparative Example 1 | Comparative Example 2 | Example 1 |
|---|---|---|---|
| Judgment | X | X | ○ |

Thickness of Release Layer

Next, thicknesses of the release layers were compared The fluororesin (brand name, Daikin Latex) was used for a material of the release layers, and it was sprayed at a predetermined thickness, and a visual evaluation was then conducted to find out whether uniform coating had been achieved. Regarding judgments, O is given in a case where the uniform coating was achieved, whereas X is given in a case where the coating was not uniform. Table 4 shows results of judging the thicknesses and uniformity of the release layers. It is obvious that a thickness of 0.01 mm or more is required to obtain a uniform coating layer.

TABLE 4

| | Comparative Example 3 | Comparative Example 4 | Example 2 | Example 3 | Example 4 |
|---|---|---|---|---|---|
| Thickness of release layer (mm) | 0.001 | 0.005 | 0.01 | 0.03 | 0.05 |
| Judgment | X | X | ○ | ○ | ○ |

Thickness of Withstand Voltage Layer

Figure 2:
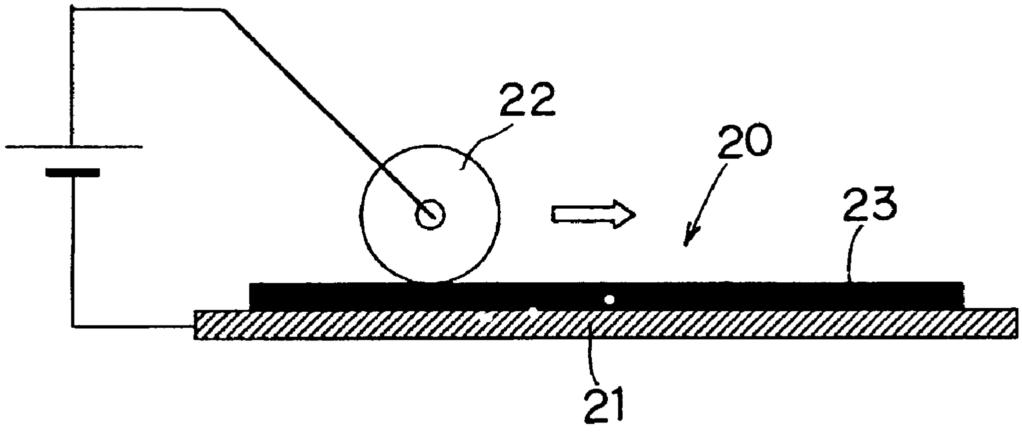
FIG. 2 is an explanatory sectional view of a spark tester.

Next, thicknesses of withstand voltage layers were compared. The thicknesses were 0.1 mm in Comparative Example 5, 0.2 mm in Example 5, 0.3 mm in Example 6, 0.5 mm in Example 7, and 0.7 mm in Example 8, A spark tester shown in FIG. 2 was used for measurement of sparks. A spark tester 20 comprises an aluminum plate 21 having a thickness of 10 mm and a metal roller 22 having a diameter of 20 to 32 mm, and the aluminum plate 21 and the metal roller 22 are configured to be able to conducted.

An evaluation using the spark tester 20 having the above configuration was conducted in the following manner. That is, test samples 23 of the comparative examples and the examples of the present invention were placed on the aluminum plate 21, and the metal roller 22 was rolled while a voltage of 2500 V was applied at 25° C., thereby determining whether or not an electric discharge occurred. In the evaluation, O is given in a case where the electric discharge did not occur, whereas X is given in a case where the electric discharge occurred. Table 5 shows a relation between the thicknesses of the withstand voltage layers and the occurrence of the electric discharge. It is understood from these results that the thickness of the withstand voltage layer should be 0.2 mm or more.

TABLE 5

| | Comparative Example 5 | Example 5 | Example 6 | Example 7 | Example 8 |
|---|---|---|---|---|---|
| thicknesses of withstand voltage layers (mm) | 0.1 | 0.2 | 0.3 | 0.5 | 0.7 |
| Occurrence of electric discharge | X | ○ | ○ | ○ | ○ |

Figure 3:
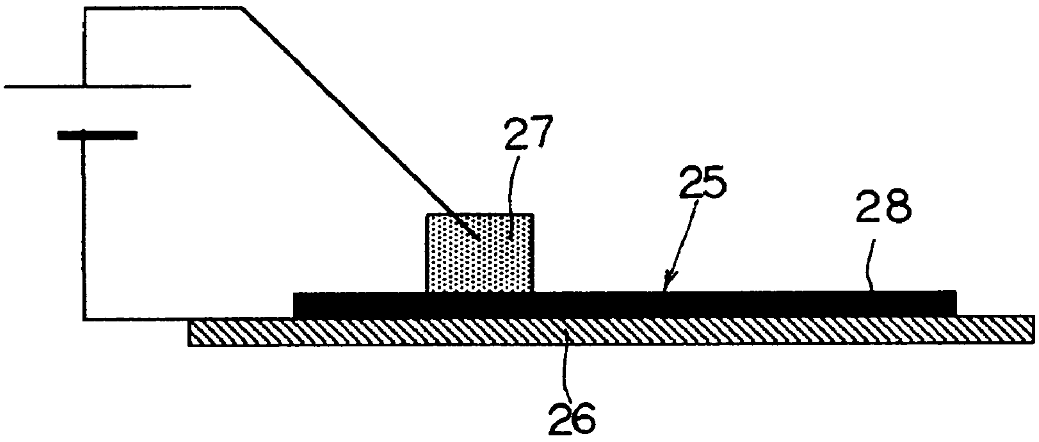
FIG. 3 is an explanatory sectional view of a device which measures a volume electrical resistivity of a withstand voltage layer.

Volume electrical resistivity of the withstand voltage layers was also evaluated. The thickness of the withstand voltage layers is set at 0.6 mm, and blending and the volume electrical resistivity of the withstand voltage layers are as shown in Table 6. A device shown in FIG. 3 was used to measure the volume electrical resistivity. A volume resistance tester 25 comprises an aluminum plate 26 having a thickness of 10 mm and a box-shaped metal block 27, and the aluminum plate 26 and the metal block 27 are configured to be able to conducted.

TABLE 6

| | Comparative Example 6 | Example 9 | Example 10 | Example 11 | Comparative Example 7 |
|---|---|---|---|---|---|
| NBR | 100 | ← | ← | ← | ← |
| Carbon | 20 | 45 | 40 | 30 | 25 |
| Plasticizer | 10 | 20 | ← | ← | ← |
| Conductive plasticizer | 1.5 | — | — | — | — |
| Silica | 15 | ← | ← | ← | ← |
| Stearic acid | 1 | ← | ← | ← | ← |
| Zinc oxide | 5 | ← | ← | ← | ← |
| Others | 13.5 | ← | ← | ← | ← |
| Vulcanizing system | 3.5 | ← | ← | ← | ← |
| Volume resistivity (Ω-cm) | $10^4$ | $10^5$ | $10^6$ | $10^9$ | $10^{10}$ |

An evaluation using the volume resistance tester 25 having the above configuration was conducted in the following manner. That is, test samples 28 of the comparative examples and the examples of the present invention shown in Table 6 were placed on the aluminum plate 26, and a voltage of 2500 V and a current of 2 mA or less were applied at 25° C., thereby measuring the volume electrical resistivity. Regarding evaluation standards, O is given to one that is up to standard, X is given to one that is below standard, and - is given to one that could not be measured. The fact that the measurement could not be performed means that an accurate measurement could not be performed by electrification because of extremely high insulating properties. From these measurement results, the volume electrical resistivity of a withstand voltage layer 12 is in the range of $10^5$ Ω-cm through $10^9$ Ω-cm at room temperature. The measurement results are as shown in Table 7.

TABLE 7

| | Comparative Example 6 | Example 9 | Example 10 | Example 11 | Comparative Example 7 |
|---|---|---|---|---|---|
| Evaluation results | X | ○ | ○ | ○ | — |

Volume Electrical Resistivity of Conductive Compressive Layer

Volume electrical resistivity of a conductive compressive layer was also evaluated. As described above, since the range of the volume electrical resistivity of the withstand voltage layer 12 is $10^5$ Ω-cm through $10^9$ Ω-cm at room temperature, volume electrical resistivity of a conductive compressive layer 14 is preferably is $10^4$ Ω-cm or less at room temperature. Blending and the volume electrical resistivity of the conductive compressive layer are shown in Table 8. The volume electrical resistivity was measured using the volume resistance tester 25 in the same manner as the measurement of the volume electrical resistivity of the withstand voltage layer.

TABLE 8

| | Example 12 |
|---|---|
| NBR | 100 |
| Conductive carbon | 30 |
| Plasticizer | 20 |
| Microsphere | 12 |
| Stearic acid | 1 |
| Zinc oxide | 5 |
| Antioxidant | 1 |
| Vulcanizing system | 3.5 |
| volume resistivity (Q-cm) | $10^4$ |

As apparent from the above description, this invention can provide printing by the image forming technique using the principle of the electrophotographic method with quality equal to that of the offset printing since the conductive support layers and compressive layer are stacked on the release layer by way of the withstand voltage layer. Further, as the conductive support layers and compressive layer are stacked, the electrode can be directly removed from the drum, resulting in simple and easy installation. Still further, the image transfer sheet has a simple structure and can be manufactured at low cost.

INDUSTRIAL APPLICABILITY

As described above, the image transfer sheet according to this invention is useful as a transfer sheet in offset printing, and particularly suitable for use in digital printing.

The invention claimed is:

1. An image transfer sheet comprising:

a withstand voltage layer provided on a surface of a release layer, and a conductive compressive layer provided on the withstand voltage layer by way of a conductive support layer;

wherein the release layer is formed of a fluororesin or an elastomer, and has a surface tension of 20 mN/m or less and a thickness of 0.01 mm or more;

wherein the withstand voltage layer has a thickness of 0.2 mm or more, a volume electrical resistivity within a range of $10^5\Omega$-cm through $10^9\Omega$-cm at room temperature, and a matrix hardness of 80 JIS-A or less;

wherein the conductive compressive layer has a volume electrical resistivity of $10^4\Omega$-cm or less at room temperature, and a porosity of 30 to 70%; and wherein the image transfer sheet has a modulus in stress of 1.0 MPa or less when the image transfer sheet is distorted 0.1 mm, and a modulus in stress of 2.0 MPa or more when the image transfer sheet is distorted 0.3 mm.

2. The image transfer sheet according to claim 1, wherein the support layer comprises a woven cloth prepared from a conductive fiber, and has a breaking strength of 1000 N/50 mm or more, a volume electrical resistivity of $10^4\Omega$-cm or less at room temperature, and a breaking elongation of 10% or less.

3. The image transfer sheet according to claim 1, wherein the image transfer sheet has a breaking strength of 2000 N/50 mm or more and a breaking elongation of 10% or less.

4. The image transfer sheet according to claim 2, wherein the image transfer sheet has a breaking strength of 2000 N/50 mm or more and a breaking elongation of 10% or less.

* * * * *